(12) United States Patent
Edwin et al.

(10) Patent No.: US 7,585,483 B2
(45) Date of Patent: Sep. 8, 2009

(54) METHOD FOR THE PRODUCTION OF PARTICULATE CARBON PRODUCTS

(75) Inventors: Emil Edwin, Stavanger (NO); Tore Arnesen, Stavanger (NO); Knut-Ivar Aaser, Stavanger (NO); Erling Rytter, Stavanger (NO); Johan Arnold Johansen, Stavanger (NO); John Fors, Stavanger (NO)

(73) Assignee: Statoil ASA, Stavanfer (NO)

( * ) Notice: Subject to any disclaimer, the term of this patent is extended or adjusted under 35 U.S.C. 154(b) by 0 days.

(21) Appl. No.: 10/580,231

(22) PCT Filed: Nov. 22, 2004

(86) PCT No.: PCT/GB2004/004920

§ 371 (c)(1), (2), (4) Date: Feb. 9, 2007

(87) PCT Pub. No.: WO2005/052229

PCT Pub. Date: Jun. 9, 2005

(65) Prior Publication Data

US 2007/0154382 A1    Jul. 5, 2007

(30) Foreign Application Priority Data

Nov. 21, 2003  (GB) ................. 0327169.9

(51) Int. Cl.
*D01F 9/12* (2006.01)
*B01J 8/18* (2006.01)
(52) U.S. Cl. ............. 423/447.3; 977/843; 422/139
(58) Field of Classification Search ............. 423/447.1, 423/447.3; 977/843; 422/139, 140
See application file for complete search history.

(56) References Cited

U.S. PATENT DOCUMENTS

| | | | | |
|---|---|---|---|---|
| 4,268,359 A | * | 5/1981 | Rammler et al. | 201/31 |
| 5,102,647 A | * | 4/1992 | Yamada et al. | 423/447.3 |
| 6,413,487 B1 | * | 7/2002 | Resasco et al. | 423/447.3 |
| 6,905,544 B2 | * | 6/2005 | Setoguchi et al. | 117/105 |
| 2003/0129122 A1 | | 7/2003 | Chen et al. | |
| 2003/0190277 A1 | | 10/2003 | Moy et al. | |
| 2004/0151654 A1 | * | 8/2004 | Wei et al. | 423/447.3 |

FOREIGN PATENT DOCUMENTS

| | | |
|---|---|---|
| AU | 2002 233 631 | 9/2003 |
| DE | 199 54 225 | 5/2001 |

(Continued)

OTHER PUBLICATIONS

Venegoni, et al., Parametric study for the growth of carbon nanotubes by catalytic chemical vapor deposition in a fluidized bed reactor, Carbon 2002; 40: 1799-1807.*

(Continued)

*Primary Examiner*—Stanley Silverman
*Assistant Examiner*—Daniel C. McCracken
(74) *Attorney, Agent, or Firm*—Bacon & Thomas, PLLC

(57) ABSTRACT

A method for the production of particulate carbon products in a reactor vessel wherein gas flow between a gas inlet port and a gas outlet port suspends a bed of catalyst-containing particulate material in the vessel and wherein the product is discharged from the vessel by falling from the bed.

18 Claims, 7 Drawing Sheets

FOREIGN PATENT DOCUMENTS

| | | |
|---|---|---|
| EP | 1 277 858 | 1/2003 |
| GB | 357135 A | 9/1931 |
| JP | 58-120510 A | 7/1983 |
| JP | 59-045912 A | 3/1984 |
| JP | 2003-146633 | 5/2003 |
| RU | 2191157 C1 | 10/2002 |
| WO | WO 02/092506 | 11/2002 |
| WO | WO 03/066521 | 8/2003 |

OTHER PUBLICATIONS

Dresselhaus, M. S., et al., "Graphite Fibers and Filaments", 1988, p. 28, line 17—p. 29, line 12 and figure 2.15a.

* cited by examiner

METHOD FOR THE PRODUCTION OF PARTICULATE CARBON PRODUCTS The present invention relates to a method and reactor and in particular a method and reactor suitable for continuous production of products such as carbon nano-fibres (CNF) and hydrogen.

It has long been known that the interaction of hydrocarbon gas and metal surfaces can give rise to dehydrogenation and the growth of carbon "whiskers" on the metal surface. More recently it has been found that such carbon whiskers, which are hollow carbon fibres having a diameter of about 3 to 100 nm and a length of about 0.1 to 1000 μm, have interesting and potentially useful properties, e.g. the ability to act as reservoirs for hydrogen storage (see for example Chambers et al. in J. Phys. Chem. B 102: 4253-4256 (1998) and Fan et al. in Carbon 37: 1649-1652 (1999)).

Several researchers have thus sought to produce carbon nano-fibres and to investigate their structure, properties and potential uses and such work is described in a review article by De Jong et al in Catal. Rev.—Sci. Eng. 42: 481-510 (2000) which points out that the cost of the CNF is still relatively high (ca. US $50/kg or more). There is thus a need for a process by which CNF may be produced more efficiently.

As described by De Jong et al. (supra) and in a further review article by Rodriguez in J. Mater. Res. 8: 3233-3250 (1993), transition metals such as iron, cobalt, nickel, chromium, vanadium and molybdenum, and their alloys, catalyse the production of CNF from gases such as methane, carbon monoxide, synthesis gas (ie $H_2$/CO), ethyne and ethene. In this reaction, such metals may take the form of flat surfaces, of micro-particles (having typical sizes of about 100 nm) or of nano-particles (typically 1-20 nm in size) supported on an inert carrier material, e.g. silica, alumina, titania, zirconia or carbon. The metal of the catalyst must be one which can dissolve carbon or form a carbide.

Both De Jong et al (supra) and Rodriguez (supra) explain that carbon absorption and CNF growth is favoured at particular crystallographic surfaces of the catalyst metal.

Although methods of producing small amounts of carbon products such as carbon nano-fibres are known in the art, methods of producing large quantities efficiently and with reliable quality have so far proved difficult to realise, particularly on an industrial scale.

Existing techniques for the synthesis of products such as carbon nano-fibres (CNF) include arc discharge, laser ablation and chemical vapour deposition. These techniques generally involve vaporising carbon electrodes at elevated temperatures. For example, the laser ablation technique involves using a laser to vaporise a graphite target in an oven. The arc discharge technique involves carbon rods, placed end to end, which are vaporised in an inert gas.

Many of these techniques involve batch processes which do not produce reliable and consistent carbon product quality in any great volume. For example, arc discharge production methods often produce CNF products which have a random size distribution and therefore require substantial purification. Laser ablation techniques on the other hand require high power sources and expensive laser equipment which leads to a high unit cost of product delivered by this technique. Fluidised bed reactors have been considered as a means to alleviate some of these problems associated with synthesising carbon and particulate products. However, the large scale production of carbon products, and in particular CNF products with uniform product size and quality, has proved difficult to achieve using conventional reactors. Fluidised bed reactors suffer from the difficulties of harvesting the synthesised product from the fluidised region and in particular do not allow products of a certain size to be harvested efficiently from the reaction region. Typically the harvested products will comprise a mixture of product quality, some having had a longer reaction time in the bed than others. This does not provide a reliable output product from the reactors.

There is therefore a need for a method and a reactor, capable of operating continuously, which can efficiently and reliably produce particulate carbon products.

Thus, viewed from a first aspect, the present invention provides a method for producing a particulate carbon product in a reactor vessel wherein gas flow between a gas inlet port and a gas outlet port suspends a bed of catalyst-containing particulate material in said reactor vessel and said particulate carbon product is discharged from the reactor vessel by falling from the bed, e.g. through a particulate product outlet port arranged beneath the bed.

Viewed from a second aspect, the present invention provides a reactor comprising a vessel having a gas inlet port, a gas outlet port and a particulate product outlet port, said gas inlet port being arranged such that in use gas flow therefrom suspends a bed of catalyst containing particulate material in said vessel and particulate product is discharged from the reactor by falling from the bed, e.g. through the particulate product outlet port.

In effect the reactor can be seen to be an 'inverted' fixed or fluidised bed reactor since, unlike conventional fixed or fluidised bed reactors, the reaction bed or region is formed in the reactor vessel without a mechanical support so that the particulate product can be harvested once it falls from the reaction bed.

The reaction bed may be a fluidised bed or alternatively may be a fixed bed, or simply a region of flowing gas in which the particles are entrained in the gas. The nature of the reaction bed depends on the gas flow rate and on whether the gas flows through a barrier which is gas permeable but essentially impermeable to the particles. Where such a barrier is present, at sufficiently high gas flow rates a fixed reaction bed will be formed underneath the barrier.

The reactor may be provided with means to prevent the particulate product and/or catalyst from leaving the reactor through the gas outlet port. Preferably, the reactor is provided with means to allow the outlet gas to leave the reactor but to retain the product and/or catalyst within the reactor. This may thus function as the barrier mentioned above.

Alternatively where the product and/or catalyst leaves the reactor vessel through the gas outlet port the reactor may be provided with means to return the product and/or catalyst to the reactor vessel. For example, the reactor may be provided with a cyclone or radiclone into which the outlet gas is fed and which removes the particulate product and/or catalyst from the outlet gas flow. The reactor may then be provided with means to return the product and/or catalyst to the reaction bed.

Preferably the reactor is provided with a filter or gas permeable barrier through which the outlet gas flows to retain the product and/or catalyst upstream of the filter or barrier.

The gas permeable barrier may be arranged in the gas outlet pipe or conduit of the reactor or alternatively within the reactor vessel itself. When located in the reactor vessel the gas permeable barrier may be located between the gas outlet and gas inlet such that the reaction region is formed below the lower surface of the gas permeable barrier.

The gas permeable barrier is preferably located towards the top of the reactor vessel and more preferably defines the top of the reactor vessel. In this arrangement the gas permeable barrier can extend across the entire cross-section of the reactor vessel thereby maximising the filtering area and reducing the gas velocity through the barrier and the pressure drop across the barrier.

The catalyst and particulate product are supported and suspended in the reactor vessel and in the reaction region by the flow of gas through the reactor vessel. The flow rate of gas may therefore be controlled so as to vary the size of the product discharged from the reaction region and from the reactor vessel.

The gas flow rate is preferably selected so that a region is provided between the reaction region and the gas permeable barrier where little or no particulate material is present, i.e. a region where little or no reaction occurs. A gas-suspended fluidised bed or reaction region can therefore be generated in this way.

Alternatively a higher gas flow rate may be selected so that the reaction bed or region is located against the gas permeable barrier. An inverted fixed reaction bed or region can thereby be formed.

The permeability of the barrier, i.e. the pore size, aperture size or minimum diameter of the gas flow path through the barrier, is preferably selected to prevent the particulate material in the reaction region passing through the barrier. Especially preferably it is selected to prevent catalyst-containing particles that are fed into the reactor before or during operation from passing through the barrier.

While the barrier may be perforated metal, it is preferably a porous ceramic. Alternatively, the barrier may be a filter formed from carbon nano-fibres or glass fibres.

The reactor vessel may also be provided with means to provide a back pressure to reverse the flow of gas through the gas permeable barrier or filter in order to unblock any blocked pores or apertures. Typically this may be achieved by providing the top of the reactor with a gas inlet port through which pressurised gas can be introduced into the vessel and which can flow through the gas permeable barrier in a reverse direction, i.e. gas flow in an opposite direction to gas flow when the reactor is in normal operation. A back pressure may be provided during operation of the reactor by pulsing a reverse gas flow or alternatively by stopping the reaction and providing a reverse gas flow.

It will be appreciated that the reactor vessel may be provided with more than one gas inlet port and with more than one gas outlet port.

To minimise catalyst deactivation, the inlet gas (or feed gas) is preferably fed into the reactor vessel and the reaction region at a plurality of points around the reaction region. The reaction region gas inlet port(s) may be arranged tangentially to the inner surface of the vessel so as to introduce gas into the reaction bed at an angle and to spin or rotate the reaction bed. Alternatively, the reaction region gas inlet ports may be arranged at varying angles to the inner surface of the vessel so as to agitate the reaction region. These inlet ports moreover may be disposed away from the reactor vessel inner walls towards or at the vessel centre. In this way gas may be introduced within the reaction bed itself. If this arrangement is adopted, the gas conduits extending into the reactor vessel are preferably made of or coated with a ceramic material to reduce surface corrosion.

The particulate catalyst may be introduced into the vessel via the gas inlet port. Alternatively, the vessel may be provided with one or more catalyst inlet ports through which the catalyst can be introduced.

Preferably, a catalyst inlet port introduces catalyst into the vessel proximate the reaction region so that the catalyst is dispersed into the reaction region. Alternatively the catalyst may be introduced into a lower temperature and or pressure region within the reactor vessel. The catalyst may be introduced into the reactor in a powder form using a gas or alternatively may be introduced into the reactor as or using a liquid.

The catalyst may be introduced continuously or batchwise.

The catalyst may be introduced into the reactor vessel entrained in a carbonaceous feed gas; however to reduce carbon deposition in the feed lines, it will generally be preferred to use a gas or liquid carrier which does not react with the catalyst. Nitrogen may thus be used as a carrier in this regard.

The vessel may be provided with more than one product outlet port although in general it is believed one will be sufficient.

The vessel may have a product collection area arranged at the bottom of the reactor vessel and may also have means to remove product from the reactor or product collection area.

Particularly preferably the product outlet port leads to a particulate product collection vessel which is isolatable from the reactor vessel, e.g. to permit removal of the collection vessel from the reactor or to permit removal of the product from the collection vessel (e.g through a product removal port in the collection vessel). The collection vessel will preferably be provided with a cooling means, e.g. a cooling jacket. Especially preferably the cooling means is a heat exchanger whereby heat may be transferred from the product to the feed gas.

The reactor may be arranged at any angle where the particulate product outlet port is located beneath the reaction region such that the particulate product is discharged from the reactor vessel by falling into a collection area from the reaction region. Preferably the reactor is arranged so that the particulate product outlet port is arranged vertically beneath the reaction region.

The reactor vessel may be surrounded by an outer casing surrounding and supporting the vessel. The outer casing, gas inlet, gas outlet and the particulate product outlet port (and associated conduits) may be manufactured from a high temperature steel.

The gas inlet and outlet ports and the particulate product outlet port (and associated conduits) are preferably manufactured from a steel with a silicon content of between 1.8% and 2.3% and a chromium content of greater than 30%. Sophisticated materials with more than 2.5% aluminium, e.g APM, APMt (manufactured by Sandviks) or MA956 (manufactured by Special Metals) may also be used. Conventional chromium based tubing can be used to reduce the iron fraction of the metal surface and thereby reduce the tendency towards dusting or carbon deposition on the surface of the tubing or conduits. The reactor vessel may also be manufactured from similar material. Preferably however the reactor vessel is manufactured from or lined with a high temperature resistant castable ceramic material such as, for example, Ceramite® manufactured by Elkem ASA, Norway.

The reaction within the reactor vessel may take place at ambient temperature and pressure. Preferably however the reactor operates at an elevated temperature and pressure. Preferably the reactor operates between 2 and 25 bar and more preferably between 5 and 20 bar. Most preferably the reactor operates between 5 and 15 bar. The reactor may typically operate at a temperature of up to 1000° C. Preferably the reactor operates in the range 400° C. to 900° C. and most preferably in the range 550° C. to 900° C. In this context, temperature and pressure refer to temperature and pressure in the reaction bed.

The outer casing may be internally pressurised to a pressure equal to the pressure within the reactor vessel. This is particularly advantageous where a ceramic vessel is used. Pressure equalising the inner and outer reactor vessel walls reduces stresses within the ceramic material when reaction in the reactor takes place at elevated pressures. The outer casing may further be provided with an insulating layer between the outer casing and the reactor vessel outer wall. The insulating material may, for example, be an insulating mineral wool or some other suitable insulating material.

Where endothermic reactions take place within the reactor vessel the reactor may be provided with means to heat the reaction region and/or gas within the reactor vessel. The heating means may be heating coils for example and may be integrated into the wall of the reactor vessel. The heating means may, for example, be arranged in cavities or apertures within a ceramic reactor vessel.

Alternatively, heating coils may be arranged around the exterior of the vessel or within the reactor vessel itself.

Where the reaction is endothermic, heat is preferably also provided into the reaction region by introducing the feed gas into the reactor vessel at elevated temperature. It is especially preferred in this respect to introduce the feed gas within the reaction region as well as before the reaction region as in this way the required feed gas inlet temperature may be reduced so reducing the risk of catalyst deactivation. Where one of the gases making up the feed gas is reactive with ferrous metals at elevated temperatures, e.g. where carbon monoxide is used, it will generally be desirable to introduce such a gas at a lower temperature than that used for the remaining gases.

As mentioned above, the reactor may further include means to cool the particulate product leaving the reactor vessel. For example, the reactor may be provided with a cooling cavity or jacket surrounding the particulate product outlet port of the reactor or arranged adjacent to the product outlet port. The cooling cavity may be provided with a continuous flow of coolant such as water or feed gas which reduces the temperature of the product leaving the reactor vessel. Other coolants can equally be employed in the cooling cavity to cool the product.

A reactor according to the present invention may be used particularly advantageously in the production of carbon products and in particular carbon products such as carbon nano-fibres (CNF).

Thus, viewed from another aspect, the invention provides a reactor arranged to produce carbon nano-fibres comprising a vessel having a gas inlet port, a gas outlet port and a particulate carbon product outlet port, said gas inlet port being arranged such that in use gas flow therefrom suspends a bed of catalyst-containing particulate material in said vessel and particulate carbon product is discharged from the vessel by falling from the bed, e.g. through the particulate product outlet port.

The reactor may conveniently have a volume of 10 to 100 m$^3$, preferably 50 to 70 m$^3$ allowing a total product content in the thousands of kilograms. For continuous operation, inlet gas feed rates of 500 to 2000 kg/hour, eg 1000 to 1500 kg/hour, and product removal rates of 200 to 2000 kg/hour, eg. 750 to 1250 kg/hour may thus typically be achieved. The energy supply necessary to operate such a reactor for the production of carbon will typically be in the hundreds of kW, eg 100 to 1000 kW, more typically 500 to 750 kW. Alternatively expressed, the energy demand will typically be in the range 1 to 5 kW/kgC.hour$^{-1}$, e.g. 2-3.5 kW/kgC.hour$^{-1}$.

Any suitable catalyst may be used in the production of CNF which can dissolve carbon or form a carbide and which is capable of being suspended in the gas flow within the reactor.

The catalyst may be any transition metal such as iron, cobalt, nickel, chromium, vanadium and molybdenum or other alloy thereof. Preferably the catalyst is an FeNi catalyst. The catalyst may be supported on an inert carrier material such as silica, alumina, titania, zirconia or carbon.

More preferably the catalyst used is a porous metal catalyst comprising a transition metal or an alloy thereof, e.g. as described in WO 03/097910 the contents of which are hereby incorporated by reference. The use of the Raney metal catalysts described in WO 03/097910 especially the Amperkat® catalyst mentioned therein is especially preferred.

In order that the catalyst particles fulfil certain aerodynamic criteria the catalyst may be pre-treated prior to entering the reactor vessel in order to increase the drag on the catalyst.

The catalyst may also be pre-treated to increase carbon production rate and carbon yield and this may be achieved with any carbon production catalyst, i.e. not just porous metal catalysts, by a limited period of exposure to a feed gas with reduced or no hydrogen content at a lower temperature than the reaction temperature in the main carbon production stage. Such pre-treatment is preferably under process (i.e. reactor) conditions under which the carbon activity of the catalyst is greater than in the main carbon production stage. This process thus comprises in a first stage contacting a catalyst for carbon production with a first hydrocarbon-containing gas at a first temperature for a first time period and subsequently contacting said catalyst with a second hydrocarbon-containing gas at a second temperature for a second time period, characterised in that said first gas has a lower hydrogen ($H_2$) mole percentage than said second gas, said first temperature is lower than said second temperature, and said first period is shorter than said second period. If a higher graphitic contact of the carbon product is desired, the first temperature may be reduced and/or the second temperature may be increased.

The temperature in the first period is preferably in the range 400 to 600° C., especially 450 to 550° C., more especially 460 to 500° C. The hydrogen mole percentage in the first period is preferably 0 to 2% mole, especially 0 to 1% mole, more especially 0 to 0.25% mole, particularly 0 to 0.05% mole. The pressure in the first period is preferably 5 to 15 bar, especially 6 to 9 bar. The duration of the first period is preferably 1 to 60 minutes, more especially 2 to 40 minutes, particularly 5 to 15 minutes. The temperature, pressure and gas composition, in the second period are preferably as described above for the reactor.

Pre-treatment or initiation of the catalyst causes the catalyst to become a catalyst/carbon agglomerate comprising particles of a carbon-containing metal having carbon on the surfaces thereof. Before this pre-treatment, the catalyst may if desired be treated with hydrogen at elevated temperature, e.g. to reduce any surface oxide.

The gas flowing from the gas inlet to the gas outlet may be any suitable gas for sustaining the reaction in the reaction region. For CNF production the gas may be any $C_{1-3}$ hydrocarbon such as methane, ethene, ethane, propane, propene, ethyne, carbon monoxide or natural gas or any mixture thereof. Alternatively, the gas may be an aromatic hydrocarbon or napthene.

The inlet gas may also include a proportion of hydrogen to reduce the carbon activity of the catalyst metal, i.e. the rate of carbon uptake by the metal. The gas may typically contain 1 to 20% mole of hydrogen. Preferably the gas contains 2 to 10% mole hydrogen.

The inlet gas may include carbon monoxide. However, carbon monoxide is preferably introduced at a lower temperature (e.g. <300° C.), for example through a separate feed line, e.g. to avoid dusting of ferrous metal feed lines which can occur at temperatures above 400° C. Carbon monoxide is a desirable component of the feed gas as the reaction to produce carbon is less endothermic than that of methane for example.

When carbon monoxide is introduced into the reactor vessel through a separate gas inlet, the main feed gas inlet may have a correspondingly higher inlet temperature such that the gases mix in the reactor vessel to produce a mixture at the appropriate temperature.

Where the feed gas passes through metal pipes or conduits (such as iron or chromium based metals or alloys), the oxide layer on the surface of the pipe or conduit (which acts to protect the metal) can be maintained by introducing a small quantity of an oxygenaceous compound (e.g. water or $CO_2$) into the feed gas.

The inlet or feed gas may be recirculated completely or partially from the gas outlet back to the gas inlet. Alternatively the gas may flow through the reactor once. More preferably a proportion of gas is recirculated internally within the vessel. Internal recirculation (or backmixing) of the gas within the reactor can be used to control the hydrogen content within the reactor and thus reduce the amount of hydrogen which needs to be introduced into the reactor vessel.

Gas removed from the reactor vessel is preferably passed through a separator in which hydrogen is removed by metallic hydride formation. Pellets of a metallic hydride in a column absorb the produced hydrogen at a low temperature, and the absorbed hydrogen can then be recovered by raising the temperature in the column.

Excess hydrogen may alternatively be removed by passing the gas past a membrane, polymer membrane or pressure swing absorber (PSA). The membrane may for example be a palladium membrane. Hydrogen retrieved in this way may be an end product of the carbon production reaction or it may be burned to provide energy, e.g. to heat the feed gas.

On the small scale, energy supply into the reactor may be achieved by externally heating the reactor vessel or by inclusion within the reactor of heating means or heat exchange elements connected to a heat source. The heating means may for example be electrically powered heating coils and may be integrated into the wall of the reactor vessel. The heating means may be arranged in cavities or apertures within the ceramic material.

As reactor size increases however it will become more necessary to heat the inlet or feed gas that is supplied to the reactor vessel.

The gas may be partially pre-heated or completely pre-heated to the reactor operating temperature before it enters the reactor vessel. Preferably the gas is part pre-heated before entering the reactor vessel and heated further to the operating temperature inside the reactor vessel using the reactor heating means. The gas may be pre-heated by heat exchange from the gas outlet flow leaving the reactor vessel.

The gas flowing from the gas outlet which is not recycled back into the reactor vessel may be incinerated or may, alternatively, be fed into a hydrocarbon gas stream to be used as a fuel gas or sales gas provided that the level of hydrogen is acceptable.

The carbon produced in the reactor may be processed after removal from the reactor vessel, e.g. to remove catalyst material, to separate carbon fibres from amorphous material, to mix in additives, or by compaction. Catalyst removal typically may involve acid or base treatment; carbon fibre separation may for example involve dispersion in a liquid and sedimentation (e.g. centrifugation), possibly in combination with other steps such as magnetic separation; additive treatment may for example involve deposition of a further catalytically active material on the carbon, whereby the carbon will then act as a catalyst carrier, or absorption of hydrogen into the carbon; and compaction may be used to produce shaped carbon items, e.g. pellets, rods, etc.

Processing of the carbon product to reduce the catalyst content therein may also be achieved by heating, e.g. to a temperature above 1000° C., preferably above 2000° C., for example 2200 to 3000° C. The total ash content is also significantly reduced by this treatment.

Catalyst removal from the carbon product may also be effected by exposure to a flow of carbon monoxide, preferably at elevated temperature and pressure, e.g. at least 50° C. and at least 20 bar, preferably 50 to 200° C. and 30 to 60 bar. The CO stream may be recycled after deposition of any entrained metal carbonyls at an increased temperature, e.g. 230° to 400° C.

As a result of such temperature and/or carbon monoxide treatment an especially low metal content carbon may be produced, e.g. a metal content of less than 0.2% wt, especially less than 0.1% wt, particularly less than 0.05% wt, more particularly less than 0.01% wt, e.g. as low as 0.001% wt.

The reactor vessel is preferably arranged in a vertical orientation comprising a lower conical section, a middle cylindrical section and an upper inverted conical section such that the reduced cross-sectional area of the middle section increases the gas velocity and the increased cross-sectional area of the upper section decreases the gas velocity; this acts to prevent particles leaving the upper section. This "waisted" arrangement is in itself novel and inventive.

Thus, viewed from yet another aspect an invention described herein provides a reactor comprising a vessel having a lower section having a gas inlet port and defining a particulate product outlet port, an upper section having a gas outlet port and defining a reaction bed and a middle section connecting said upper and said lower sections wherein in use gas flow from said lower section through said middle section to said upper section suspends a bed of catalyst-containing particulate material in said bed and particulate product is discharged from the vessel by falling from the bed. Preferably the middle section has a smaller cross-sectional area than the upper and lower sections. More preferably, the lower section has a conical shape, the middle section has a cylindrical shape and the upper section has an inverted conical shape. Thus, in effect, the interior of the reactor has a 'waisted' or 'hour glass' shape. The conical section may, in a preferred embodiment, be attached at both ends to cylindrical sections.

Thus, the flow rate of gas through the reactor can be used to regulate the weight of the particles being discharged from the reactor.

The use of gravity to harvest products from a reactor can also be employed in a reactor vessel containing a plurality of horizontally arranged reaction beds in combination with a suitably disposed particulate product outlet port.

Thus, a further invention disclosed herein provides a reactor comprising a vessel having a gas inlet port and containing a gas outlet port and a plurality of reaction surfaces wherein in use a product is synthesised on each of said reaction surfaces and is discharged from the vessel by falling from the reaction surfaces.

The term reaction surface is intended to mean a surface, region or bed on or in which a reaction of a gas catalysed by a catalyst occurs.

The reactor may be provided with a single gas inlet port or, more preferably, each of the reaction surfaces may be provided with individual gas inlet ports so as to feed gas directly onto each of the reaction surfaces.

The reaction surfaces may be substantially horizontal and may be configured in a 'tiered' arrangement such that product falling from an upper surface falls onto a subsequent lower surface and eventually to the bottom of the reactor.

The reaction surfaces may have increasing size towards the bottom of the reactor so that the product cascades from the upper reaction surfaces to the lower reaction surfaces. Alternatively each of the reaction surfaces may be the same size and may be provided with holes or apertures through which the product can fall either onto the surface below or directly to the bottom of the reactor by falling from the edge of a reaction surface.

Catalyst may be introduced into the reactor as described with reference to the reactors described above.

As discussed above, it is important to be able to add heat to the reaction region particularly where endothermic reactions take place within a reaction region or bed. It is therefore desirable to provide a reactor with a number of gas inlets which can introduce heated feed gas into a reaction region.

This can be achieved for reactors, other than those described above, wherein a reactor vessel is provided with a plurality of gas inlet ports or orifices.

Thus, a further invention disclosed herein provides a reactor comprising a vessel having a plurality of gas inlet ports, a gas outlet port and a particulate product outlet port, wherein in use a reaction bed is formed in said vessel containing a bed of catalyst-containing particulate material and said gas inlet ports are disposed so as to introduce gas into the reaction bed.

The gas may be introduced directly into the reaction bed, for example using a conduit extending into the region, or may alternatively be introduced through ports in the vessel wall proximate the reaction bed. The gas may be introduced into the reaction region at any angle.

The reactor vessel may be arranged at any angle. Preferably the reactor vessel is arranged in a horizontal orientation; alternatively it may be arranged at an angle up to 45° from the horizontal.

The reactor vessel may be provided with gas inlet ports arranged such that in use gas flow therefrom suspends the bed of catalyst-containing particulate material in said vessel and particulate product is discharged from the reactor vessel by falling from the bed and through one or more particulate product outlet ports.

The product outlet ports may be arranged along the base of the vessel in the direction of travel of the bed such that particulate products can be harvested from the reactor by falling from the bed. Alternatively the gas outlet port and particulate product outlet port may be a common outlet port at the downstream end of the vessel.

The reactor may also preferably be provided with gas inlet and/or gas outlet ports above and/or along the reaction bed.

The vessel may further be arranged so as to have an increasing cross-sectional area in the direction of gas flow. More preferably the vessel may be cylindrical or conical in shape.

With reference to the reactors discussed above, the gas inlet ports may be arranged tangentially to the reactor vessel so as to agitate or spin the reaction bed. For example the gas inlet ports may be arranged at 45° to the reactor vessel wall.

The reactor vessel may be static or may alternatively be arranged to rotate so as to agitate the reaction bed. In such an arrangement, the inside of the reactor vessel may be provided with stirring members or means connected to the inside of the reactor vessel such that the bed is agitated and stirred as the vessel rotates. This arrangement can be used to improve temperature distribution in the bed and/or to change the product size by erosion of the product.

Thus, gas can be provided along the length of the reaction region thereby improving the efficiency of the reaction.

Preferred embodiments of the invention will now be described, by way of example only, and with reference to the accompanying drawings in which.

Figure 1:
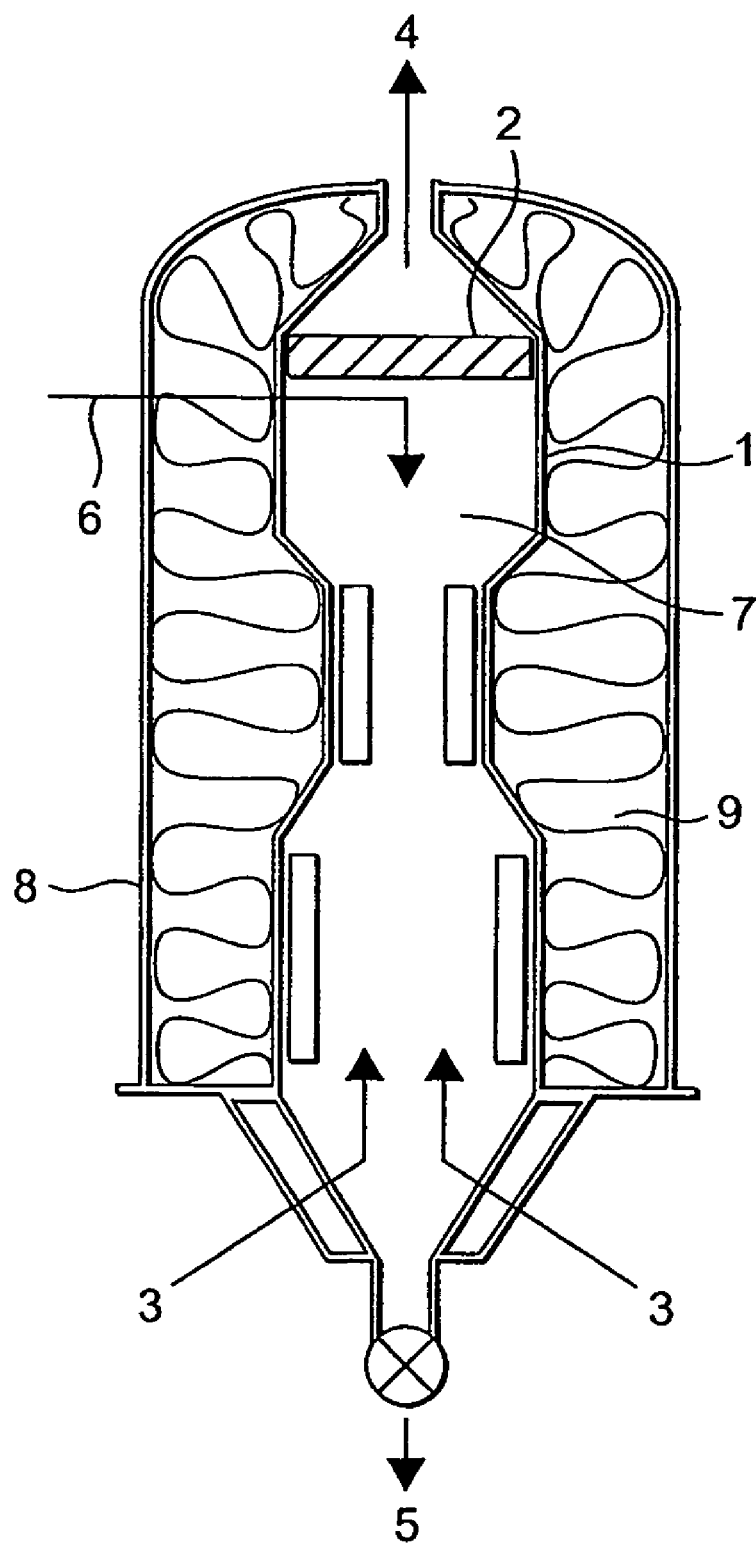
FIG. 1 shows a schematic of a reactor according to a first embodiment.

FIG. 1 is a schematic of the main elements of the reactor. The reactor comprises an inner ceramic reactor core or vessel 1, a gas permeable barrier 2, a gas inlet (for feed gas) 3, a gas outlet (for off-gas) 4 and a product outlet port 5. In the preferred embodiment an FeNi catalyst (e.g. a Raney metal catalyst of the type sold by H. C. Starck, GmbH & Co. AG, Goslar, Germany under the trademark Amperkat®) is introduced into the reactor through catalyst inlet port 6 into the reaction region 7.

The reactor core 1 is preferably manufactured from Ceramite® (a castable high temperature ceramic material) and is surrounded by an outer shell 8 which is preferably manufactured from a high temperature steel.

The cavity 9 between the outer shell and the core is filled with a mineral wool insulating material to insulate the steel casing 8 from the ceramic core 1.

In operation the outer shell is pressurised to equal the pressure within the reactor core. Equal pressures on the inner and outer walls of the ceramic core reduces the stress within the ceramic material. The outer shell also provides connections for the carbonaceous gas inlet port, catalyst inlet port, product outlet port and gas outlet port.

A ceramic, gas-permeable barrier 2 is arranged at the top of the reactor and extends across the entire cross-section of the reactor core. The barrier is manufactured with a plurality of pores or apertures which allow the gas to pass through the barrier and out of the reactor. In the production of CNF with a product size of between 1.5 mm and 8 mm and a catalyst size of 0.1 mm the pores are small enough to prevent the catalyst and product from passing through the barrier.

The economy of the reactor is linked to a ratio (D) of carbon deposited to catalyst used and the average carbon deposition rate ($H_m$) because the purity in the final carbon product and the catalyst costs rise with D. The reactor size and degree of complexity rises with $D/H_m$. Typically, the reactor volume ($V_r$) in $m^3$ for a production rate of R tonnes/hour is given by:

$$V_r = D \cdot R / (2\, k_v \cdot H_m \cdot \sigma)$$

where $V_r$ reactor volume ($m^3$)

D carbon deposition degree (kg carbon per kg catalyst)

R carbon production rate (tonnes/hour)

$k_v$, $k_v$ is a correction factor $H_m$ average carbon deposition rate (kg carbon per kg catalyst per hour)

σ geometric density.

Setting the correction factor $k_v$ at 1 gives the theoretical minimum reactor volume for a production rate R. This can be achieved in a reactor which is run on a batch-wise basis until the reactor plugs or the catalyst is completely deactivated, i.e. when there is no further methane conversion. In an industrial-scale reactor, the reactor should preferably produce continuously and the carbon must be taken out of the reactor before the catalyst is deactivated, otherwise the reactor volume will be unnecessarily large because $H_m$ goes to zero. A production rate of 20 tonnes/h of CNF in an industrial reactor (e.g. $k_v$=0.5) typically gives a reactor volume of 150 to 200 m$^3$ when typical values for catalysts are selected (e.g. D=200 kgC/kg catalyst and $H_m$=45 kgC/kg catalyst per hour and the geometric density $\sigma$=0.5). Realistically; the total reactor volume where $k_v$=0.5 for a production rate of 20 tonnes/hour can thus be about 400 m$^2$. This gives a catalyst usage of R/D=100 kg/hour when D=200 and leads to the case where R·D/2$H_m$=44 tonnes of carbon in the reactor bed. In practice a production rate of 20 tonnes/hour would generally be split between several reactors.

In operation, carbonaceous gas (e.g. 90% mole methane and 10% mole hydrogen) at a pressure of 10 bar is introduced into the gas inlet port 3 of the reactor. A further one of the plurality of inlets 3 shown in FIG. 1 may be a carbon monoxide feed at a lower temperature than the methane feed. The gas flows vertically through the reactor and out of the gas outlet port 4.

Figure 2:
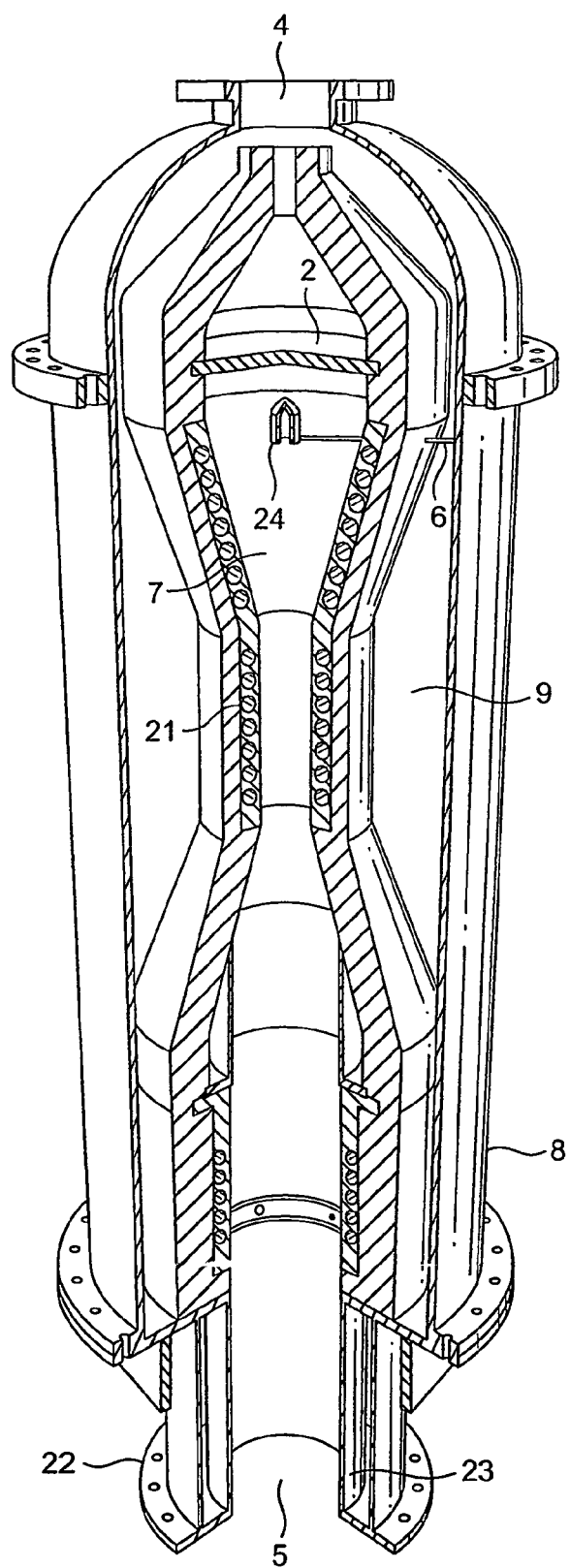
FIG. 2 shows a cut-away of the reactor vessel.

An FeNi catalyst is introduced into the reactor through port 6 and into the gas stream through a distribution nozzle 24 (as shown in FIG. 2) which distributes the catalyst evenly over the cross-section of the reaction region 7. A gas flow rate between the gas inlet and gas outlet for a given reactor size is selected so as to suspend the catalyst below the gas permeable barrier 2 in the reaction region 7. The pores or apertures within the barrier are sufficiently small to prevent the catalyst and CNF product from travelling through the gas permeable barrier but allow the gas to pass through the barrier.

The reaction taking place within a CNF producing reactor is the decomposition of methane into carbon and hydrogen, i.e.

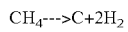

The reaction is endothermic with hydrogen as a by-product and requires that the reaction zone be heated, typically to a temperature of at least 650° C. The carbon product grows on the FeNi catalyst, and experiments show a growth ratio of 1:200. The carbon growth will end when the grown carbon obstructs the supply of methane to the FeNi catalyst.

The carbon nano-fibres grow on the surface of the FeNi catalyst which are suspended in the reaction region. In the reactor shown in FIGS. 1, 2 and 3, the fibres grow until they are too heavy to be suspended by the flow of gas and then fall to the bottom of the reactor and out of the reactor and are removed through the particulate product outlet port 5.

The gas leaving the reactor through outlet 4 is partially recycled and fed back into the reactor through inlet 3. The presence of too much hydrogen in the inlet gas reduces the carbon formation rate and hydrogen is therefore separated from the recycled outlet gas using a palladium membrane (not shown).

During operation, the apertures within the barrier 2 through which the gas flows may become blocked with carbon particles produced in the reaction process. Intermittently applying a reverse flow of gas to the top of the reactor means that the pores in the gas permeable barrier 2 can be cleared.

FIG. 2 shows a cut-away of the core 1 showing the electrical heating coils 21 integrated into the ceramic reactor wall.

Before entering the reactor, the gas is first pre-heated by passing the gas through a heat exchanger (not shown) which exchanges heat from the outlet gas so as to reduce the heating requirements of the electrical heating coils 21. The electrical heating coils 21 then raise the gas temperature to the operational temperature for CNF production.

As shown in FIG. 2, a cooling section 22 is provided between the reactor and a CNF product handling unit (not shown). The cooling section 22 includes a cooling cavity 23 in which a coolant flows to cool the product as it passes through the section 22.

The cooled carbon enters the product handling unit (not shown) where a wheel feeder fills a lock-chamber. The wheel feeder operates at zero pressure differential, and the lock-chamber therefore operates at the same pressure as the reactor. Downstream of the lock-chamber, a further chamber, separated by a valve, is provided. The second chamber is used to depressurize and flush the carbon before it leaves the process equipment.

Figure 3:
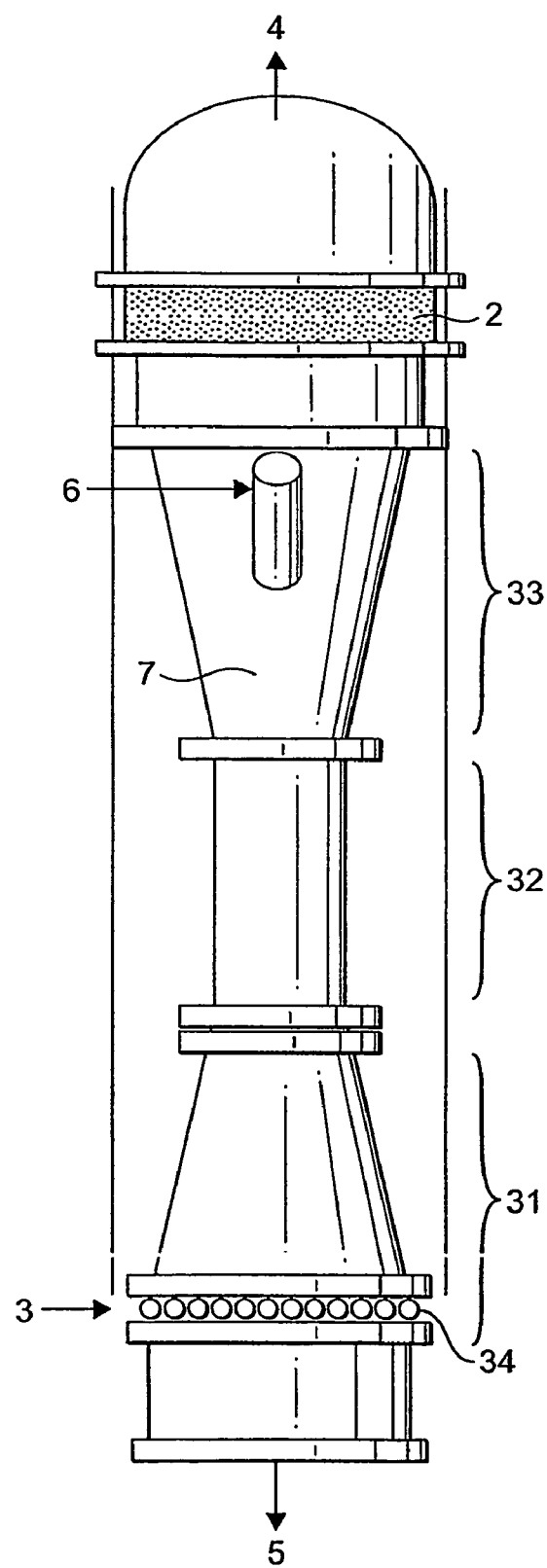
FIG. 3 shows a simplified diagram of the reactor and the three sections of the preferred embodiment of the reactor.

FIG. 3 shows the three sections of a preferred embodiment of the reactor. The first or lower section 31 is arranged at the bottom of the reactor, has a conical shape and defines the product output port 5 which is arranged vertically beneath the reaction region 7. Inlet gas is supplied into the reactor through a plurality of orifices 34 arranged around the periphery of the lower section 31.

The gas flows into the lower section 31 through gas inlet 3 and orifices 34 and through the reduced cross-section middle section 32 where it is heated by the heating coils 21 (shown in FIG. 2).

The gas then flows into the third or upper section 33 which has an inverted conical shape and defines the reaction region 7 and acts as a wind sieve. The upper limit of the third section 33 is defined by the gas permeable barrier 2 which extends across the cross-section of the third section.

CNF is generated in the reaction region 7 and falls under gravity through the middle and lower sections 32, 31 and out of the reactor through product outlet port 5. The arrangement of the conical lower section 31, the cylindrical middle section 32 and the upper inverted conical section 33, makes it possible to retain the carbon product and catalyst in the upper section 33 by the high gas flow rate in the cylindrical middle section 32 of the reactor. The reduced cross-sectional area of the middle section increases the gas velocity which holds the carbon product in the upper section until the amount of carbon deposited on the catalyst particle has increased the weight of the catalyst particle to the extent that the upward flow of gas flowing through the middle section 32 can no longer support the particle. The middle section 32 in combination with the upper section 33 thus acts as a wind screen allowing only particles having a certain weight through the middle section and to the lower section 31. When a catalyst particle with carbon deposits passes through the middle section into the lower section the gas velocity in the lower section is lower and the particle will fall to the product outlet port 5. Regulating the velocity of gas in the middle section 32 can thus be used to regulate the weight of the particles leaving the upper reaction region 7.

The reactor provides a continuous flow process for producing carbon nano-fibres. Catalyst can be introduced into the reactor using a batch feed catalyst pre-treatment unit (not shown).

Controlling the flow of gas through the reactor can control the level at which the catalyst and product hover in the reactor and also the size and weight of products which are discharged.

The reactor can be used as both as an inverted fluidised bed reactor and also an inverted fixed bed reactor by controlling the gas flow rate.

In an inverted fluidised bed mode of operation the reaction region is formed beneath the gas permeable barrier with an area (or wind sieve) of no reaction between the reaction region and the gas permeable barrier. Increasing the gas flow rate will move the reaction region towards the gas permeable barrier until it is held against the gas permeable barrier. An inverted fixed bed reaction region is thereby formed in which a product can grown and which can be discharged from the outlet port 5 when the product grows to a size which can no longer be supported by the gas flow.

The product outlet 5 (shown in FIG. 3) feeds into a product removal unit (not shown). The removal unit at the bottom of the reactor should be able to remove the carbon product from the reactor in a safe manner. As the reactor is pressurised, the removal unit should retain the pressure within the reactor during the removal process. In addition, the explosive atmosphere surrounding the carbon should be vented off and purged with nitrogen before the carbon leaves the unit.

Figure 4:
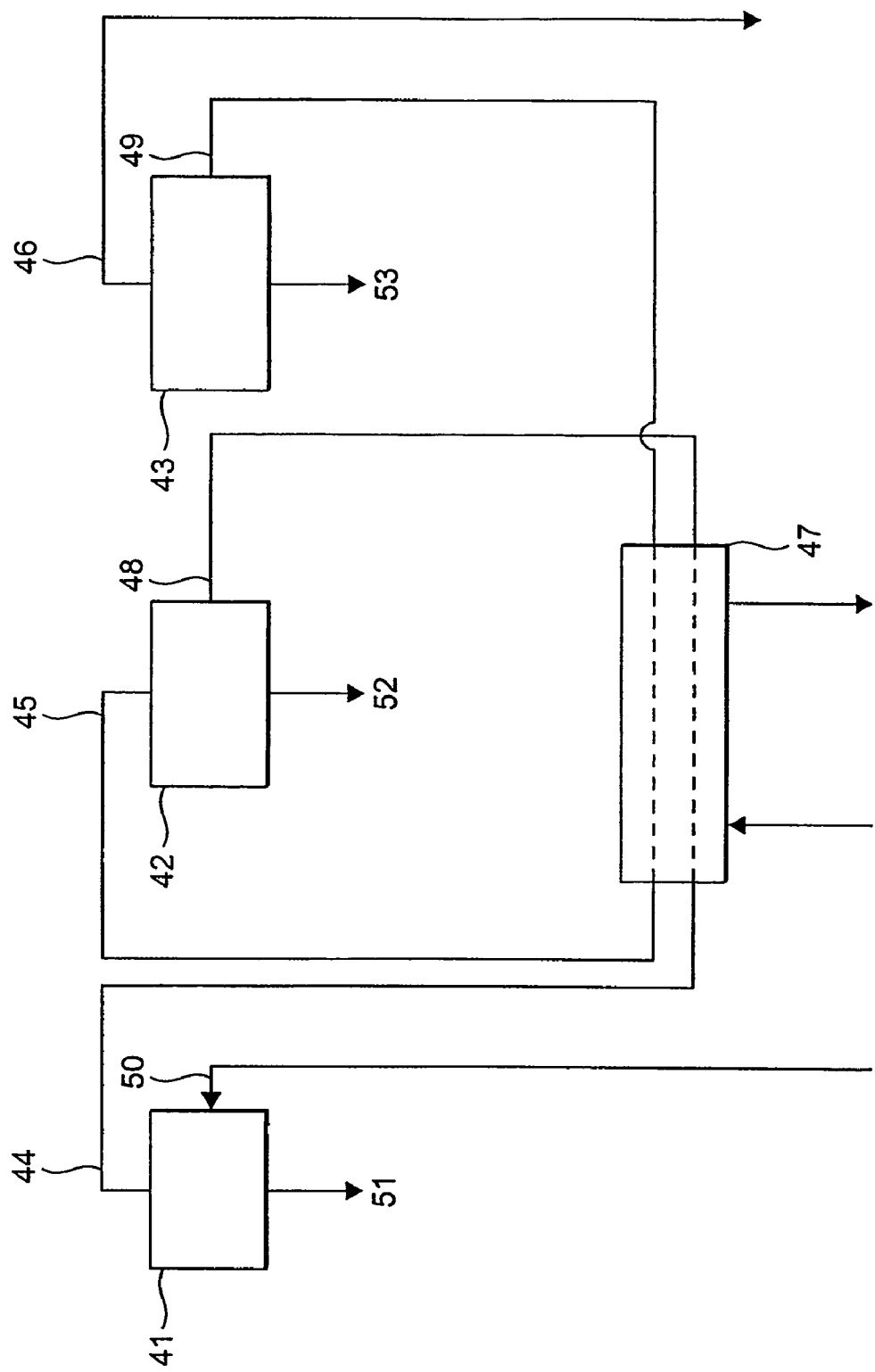
FIG. 4 shows a serial arrangement of reactors.

FIG. 4 shows a serial arrangement of reactors. The reactors can advantageously be arranged so that the outlet gas from a first reactor, optionally after hydrogen removal, can serve as the inlet gas for a subsequent reactor.

Reactors 41, 42, 43 each have gas outlets 44, 45, 46. Gas outlet 44 feeds, via heat exchanger 47, the gas inlet 48 of the second reactor 42. Heat exchanger 47 acts to pre-heat the gas before entering the subsequent reactor to ensure that each reactor receives gas at the correct temperature. Similarly gas outlet 45 of the second reactor 42 flows, via heat exchanger 47, to gas inlet 49 of the third reactor 43. Gas outlet 46 of the third reactor 43 is fed to an off-gas handling system (not shown) and returned to the first reactor 41 gas inlet 50. The hydrogen removal units are not shown.

Any number of reactors can be arranged in series provided that the gas pressure leaving a first reactor is sufficient to suspend the reaction region in the subsequent reactor. Advantageously this arrangement can be used to produce a range of product sizes from each reactor product outlet ports 51, 52, 53 in the series by controlling the reaction conditions within each of the separate reactors, i.e. the temperature and pressure within each reactor in the series.

Figure 5:
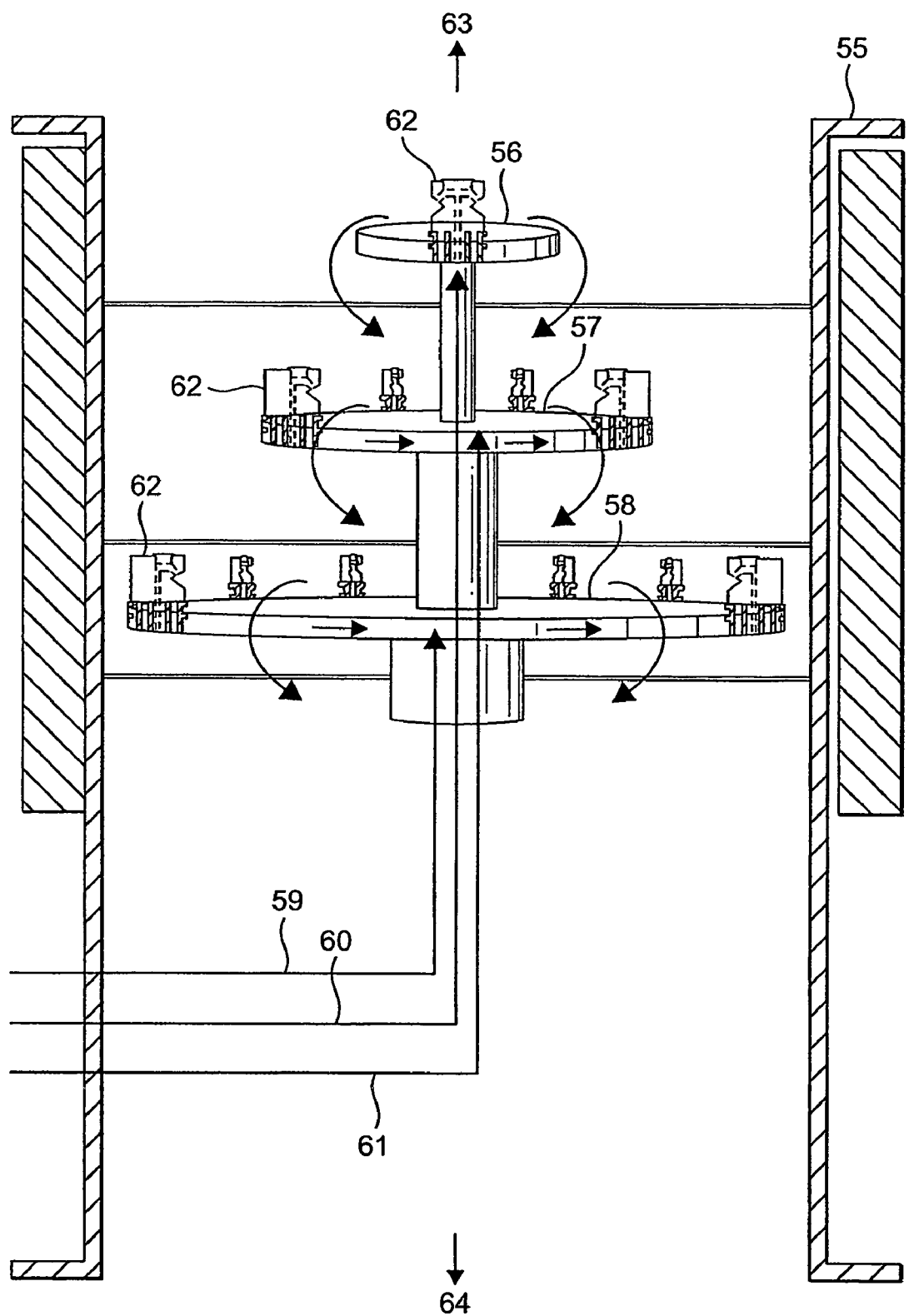
FIG. 5 shows a tiered reactor arrangement.

An alternative reactor for the production of particulate products such as CNF is shown in FIG. 5.

FIG. 5 shows a preferred embodiment of a reactor having a cascading arrangement. The reactor has an outer vessel 55 surrounding three reaction surfaces 56, 57, 58 onto which inlet gas is fed through inlet conduits 59, 60, 61 respectively. The gas is dispersed onto the reaction surfaces using nozzles 62 disposed on the reaction surfaces.

The gas is removed from the reactor though gas outlet 63 and particulate product is removed from the bottom of the reactor through product outlet port 64.

In operation an FeNi catalyst is introduced into the reactor through a catalyst inlet port (not shown) and reacts with the inlet gas (such as methane) on the horizontal reaction surfaces 56, 57, 58. As the particulate product grows it covers the upper reaction surface and falls onto the reaction surface below (the reaction surface below having a larger area than the reaction surface above, as shown in FIG. 5). Particulate product cascades over the edges of each of the reaction surfaces and eventually over the edge of reaction surface 58 where is falls out of the reactor through product outlet port 64.

The particulate product can therefore be harvested using gravity as the product reaches the edges of the reaction surfaces and falls out of the bottom of the reactor into a product collection area or zone.

Figure 6:
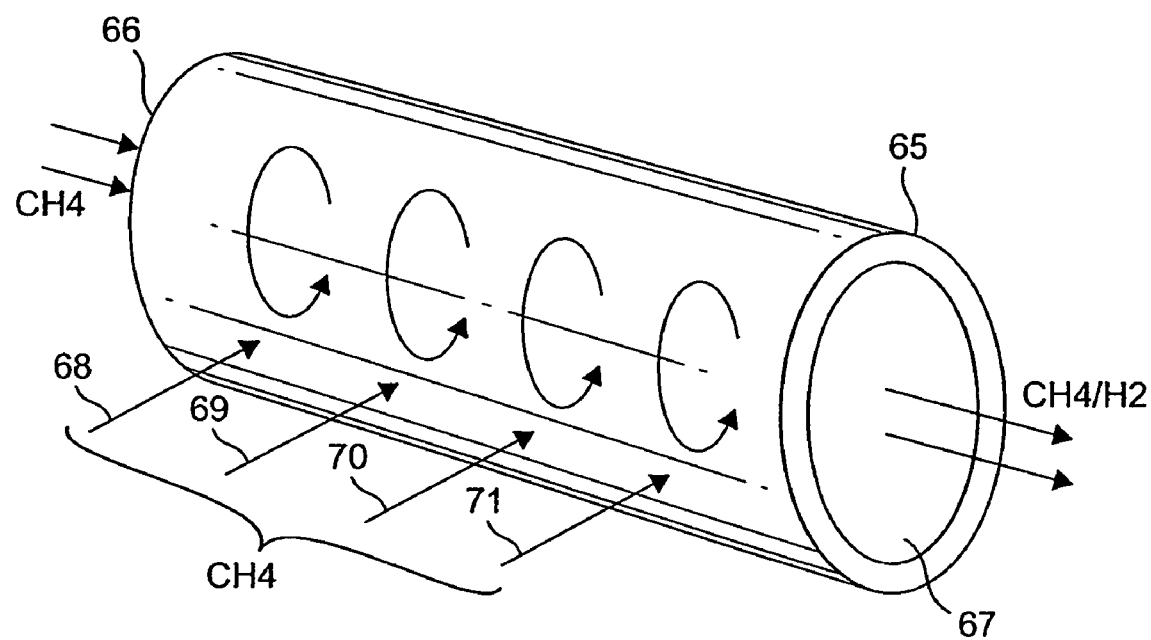
FIG. 6 shows a horizontal reactor arrangement.

A further alternative reactor for the production of particulate products such as CNF is shown in FIG. 6 in which the reaction bed can be fed with gas along the length of the reaction bed.

FIG. 6 shows a schematic of a horizontal reactor vessel 65 having a gas inlet port 66 and a gas outlet port 67.

Figure 7:
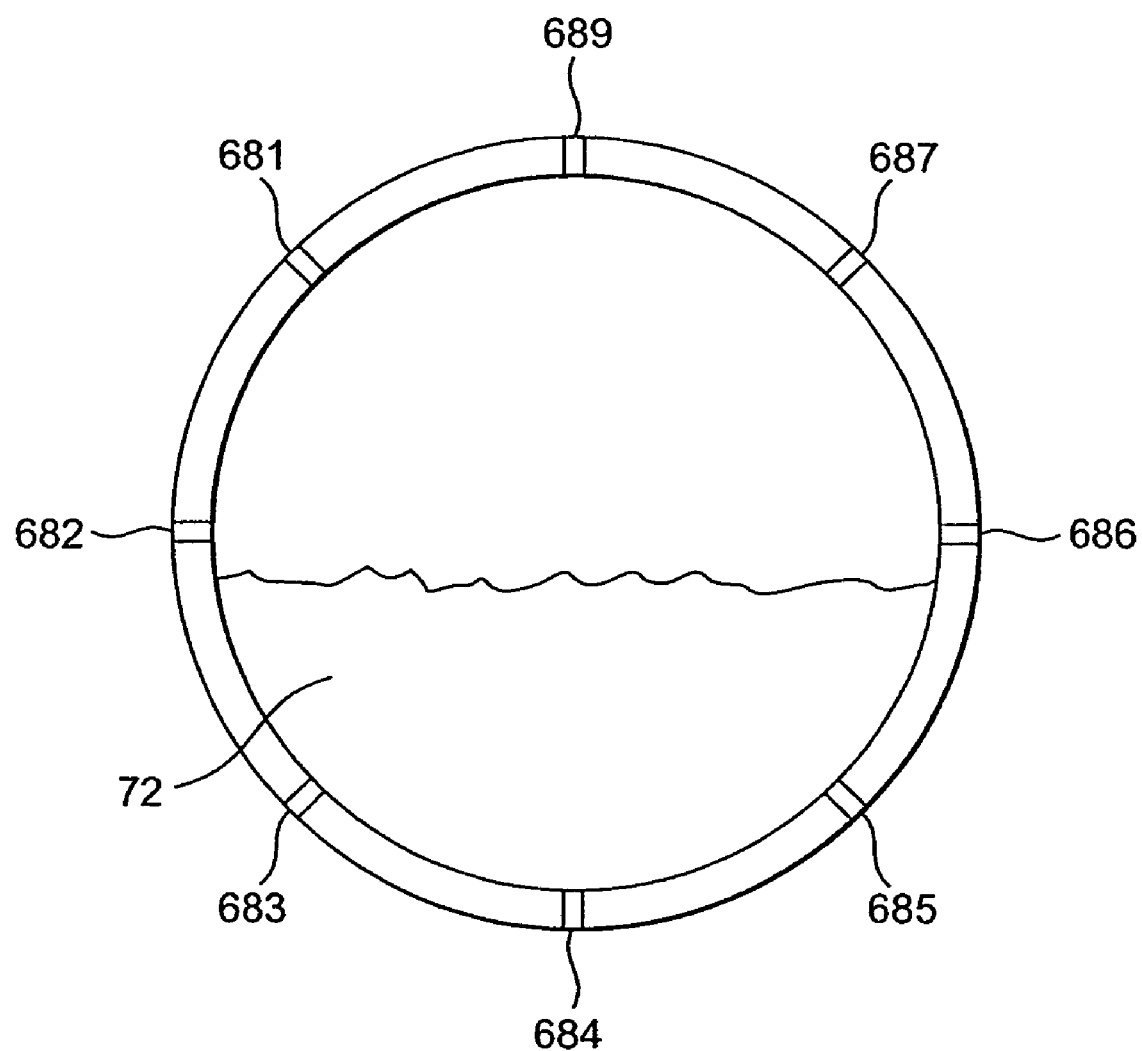
FIG. 7 shows gas inlet ports for a horizontal reactor arrangement.

The reactor also has a plurality of gas inlet ports 68, 69, 70, 71 disposed along the length of the vessel through which inlet gas such as methane is introduced into the reaction bed 72 shown in FIG. 7.

The reaction catalyst can be introduced into the reactor through the gas inlet port 66 or, alternatively, through a separate catalyst inlet port or nozzle (not shown) arranged in or proximate to the reaction bed 72.

FIG. 7 shows a cross-section of the reactor shown in FIG. 6. FIG. 7 illustrates that the gas inlet ports may be arranged around the circumference of the reactor shown by references 681-689 (FIG. 7) as well as along the length of the reactor shown by references 68-71 (FIG. 6).

Gas inlet ports around the periphery of the reactor support the reaction bed 72 and also supply feed gas for the reaction. The reactor can therefore operate as a fixed bed or fluidised bed reactor by controlling the flow rate of gas through the peripheral gas inlet ports shown in FIG. 7 and in particular the gas inlet ports arranged beneath the reaction bed 72.

In operation, heated methane gas is fed into the reactor through gas inlet 66. In addition, and as discussed above, methane gas is also introduced along the length of the reaction bed through holes 68, 69, 70, 71 in the reactor walls and around the periphery of the reactor as shown in FIG. 7.

In this arrangement of reactor, compression of the reaction bed 72 slows carbon formation. The reactor may therefore be provided with means to agitate the catalyst bed. Such agitation may be effected by the gas flow through the bed (as shown in FIG. 7) or the reactor may be provided with moving or static mixers downstream of the start of the catalyst bed (not shown). The product is removed from the reactor by the flow of gas between the gas inlet port 66 and gas outlet port 67 and is preferably collected by a filter or cyclone arranged in the outlet gas stream from the reactor.

Alternatively, some product and indeed some of the outlet gas may be removed along the length of the reactor through ports (e.g. 681 to 689 in FIG. 7) arranged to function as outlet rather than inlet ports.

Where the reactor is operated in a batchwise mode of operation, the carbon generation process may be slowed down or halted towards the end of each batch by compression of the catalyst/carbon bed, either actively or passively by allowing the catalyst/carbon bed to compress itself against the end of the reaction zone in the reactor.

It will be appreciated that many of the features disclosed herein with reference to one arrangement of reactor can equally be applied to each of the other arrangements of reactors. For example, the catalysts discussed with reference to the first reactor can equally be applied to the reactor shown in FIGS. 5, 6 and 7.

It will also be appreciated that the reactors described herein, and with reference to the drawings, can be used for the production of polymers, especially polymers of ethylenically unsaturated hydrocarbons, particularly olefin polymers. The reactor could therefore be used as a polymerisation reactor for the production of plastics.

The invention claimed is:

1. A method for producing a particulate carbon product comprising:
    flowing a gas through an inlet port in a lower section of a reactor vessel having a first cross-sectional area;
    passing said gas from the lower section to an upper section of the reactor vessel having a second cross-sectional area, via a middle section having a cross-sectional area smaller than said first and second cross-sectional areas;
    flowing said gas through a gas outlet port in the upper section;

using the flow of said gas to support a reaction bed of catalyst-containing particulate material in said upper section;

harvesting a carbon product by allowing it to fall from said upper section into said lower section; and discharging particulate carbon product from the lower section of the reactor vessel via an outlet port.

2. A method as claimed in claim 1, wherein the particulate carbon product is prevented from passing through the gas outlet port by means of a gas permeable barrier.

3. A method as claimed in claim 1, wherein the gas flow between the gas inlet port and gas outlet port is such that the reaction bed is a fluidised bed.

4. A method as claimed in claim 1, wherein the gas flow between the gas inlet port and gas outlet port is such that the reaction bed is a fixed bed.

5. A method as claimed in claim 1 wherein catalyst is introduced into the reactor vessel via the gas inlet port.

6. A method as claimed in claim 5, wherein the inlet gas comprises a carbonaceous gas and the catalyst is entrained therein.

7. A method as claimed in claim 1 wherein the catalyst is a transition metal.

8. A method as claimed in claim 1 wherein catalyst is introduced into the reactor vessel beneath the reaction bed.

9. A method as claimed in claim 1 wherein the catalyst is introduced into the reactor vessel proximate the reaction bed.

10. A method as claimed in claim 1 wherein the temperature in the reaction bed is between 400 and 900 deg. C.

11. A method as claimed in claim 1 wherein the temperature in the reaction bed is between 550 and 900 deg. C.

12. A method as claimed in claim 1 wherein the pressure within the reaction bed is between 2 and 25 bar.

13. A method as claimed in claim 1 wherein the pressure within the reaction bed is between 5 and 20 bar.

14. A method as claimed in claim 1 wherein the pressure within the reaction bed is between 5 and 15 bar.

15. A method as claimed in claim 1 wherein inlet gas is introduced into the reactor vessel at an elevated temperature.

16. A method as claimed in claim 1 wherein inlet gas is introduced into the reactor vessel via a plurality of gas inlet ports.

17. A method as claimed in claim 16 wherein inlet gas is introduced into the reactor vessel at different temperatures.

18. A method as claimed in claim 1 wherein carbon particulate product is discharged through a product outlet port disposed beneath the reaction bed.

* * * * *

UNITED STATES PATENT AND TRADEMARK OFFICE
CERTIFICATE OF CORRECTION

PATENT NO.       : 7,585,483 B2
APPLICATION NO.  : 10/580231
DATED            : September 8, 2009
INVENTOR(S)      : Edwin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 46 days.

Signed and Sealed this

Fourteenth Day of September, 2010

David J. Kappos
*Director of the United States Patent and Trademark Office*